O. M. CHASE.
APPARATUS FOR HATCHING FISH.
No. 245,704. Patented Aug. 16, 1881.
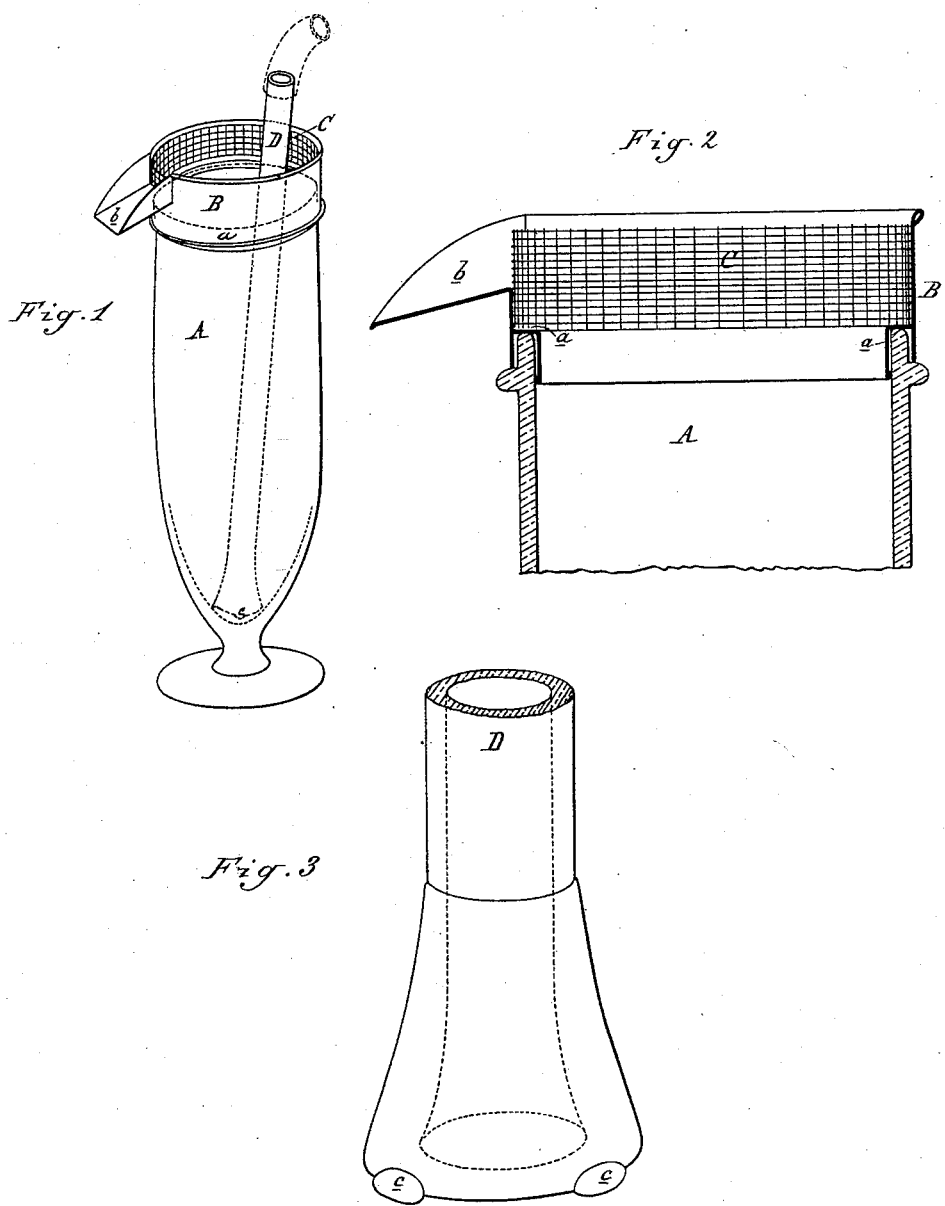

UNITED STATES PATENT OFFICE.

OREN M. CHASE, OF DETROIT, MICHIGAN.

APPARATUS FOR HATCHING FISH.

SPECIFICATION forming part of Letters Patent No. 245,704, dated August 16, 1881.

Application filed December 26, 1878.

*To all whom it may concern:*

Be it known that I, OREN M. CHASE, of Detroit, in the county of Wayne and State of Michigan, have invented an Improvement in Devices for Fish-Hatching, of which the following is a specification.

The nature of my invention relates to new and useful improvements in apparatus employed in hatching fish; and the invention consists in the apparatus more fully hereinafter described, and then pointed out in the claims.

In the drawings, Figure 1 is a perspective view of my apparatus in use. Fig. 2 is a vertical central section. Fig. 3 is a detached perspective view of the central tube.

In the accompanying drawings, which form a part of this specification, A represents a vase made of any suitable material, (glass being preferable,) the main body of which is straight and vertical, terminating at bottom in curved lines that will present no acute angles. The top is surmounted by a rim, B, which is provided with an internally-projecting ledge, *a*, upon which rests the removable wire-cloth screen C. This rim is also provided with a spout, *b*. A tube, D, also preferably of glass, is provided with small lugs *c* upon its lower end, which is enlarged, as shown. The rim should be secured to the top in such manner as to be water-tight at the point of juncture.

In practice the tube stands in the center of the jar or vase, the lugs upon its base preventing so close a fit that water will readily flow through it, and still the space will be too small to allow anything but fluid to pass. The upper end of the tube is attached to any suitable conduit for water-supply in such manner as to prevent air, except such as is found in the water, from entering—as, for instance, a tight-fitting piece of rubber hose. The vase is filled with fish-eggs, if desired, nearly to the top, and a circular piece of wire-cloth fitted as a screen and resting upon the ledge on the inside of the rim.

The meshes of the wire-cloth cover must be fine enough to prevent the eggs from passing through them, and still coarse enough to allow the fry to pass through after they are hatched out. Therefore, for fish of different species and size, it will be necessary to use wire-cloth covers of different degrees of mesh. A screen of the proper mesh will allow the fry and the empty shells, which are harmless, to pass through, but will stop the live eggs with the fry in them, and will also stop the dead eggs, so that they can be skimmed off of the top of the water.

A stream of water is allowed to run through the tube and is discharged into the bottom of the vessel, and thence upward through the eggs, keeps them in constant but gentle motion, and all are brought within the action of the water from the peculiar shape of the vase, the interior of which presents no acute angles to which any of the eggs can cling. During the process the dead eggs, the presence of which is injurious to the rest, will be, as their specific gravity is less, carried by the current to the top, where they will be stopped by the wire-cloth, as it is important that they are not discharged into the feeding-pans. As the dead eggs, therefore, come to the surface they are skimmed off or otherwise removed. In this way all labor of picking out the dead eggs (and this is a painstaking and timetaking work when done in the ordinary way) is avoided, as well as the danger of injury to the other eggs. As the fry are hatched they are carried to the top, pass through the meshes of the cover, and, with the current, out at the spout, (which also acts as a wasteway for the constantly overflowing water,) to the feed-pans or other receptacles. The tube D, which is of glass, is gradually enlarged upon curved lines at the bottom, and as the water passes under the end thereof in a thin sheet it impinges against the imperforated bottom of the vase and reacts, the enlargement or flare of the lower end of the tube giving direction to the reaction outwardly toward the walls of the vase, whereby the eggs are prevented from sticking to the walls, or from sticking together, and forced toward the center, where they are kept in constant motion.

I prefer a glass vase or vessel for several reasons, and among the more prominent are the great ease with which it may be cleaned, the prevention of oxidation, which would occur if metallic vessels were used, and because the whole process may be so clearly seen through the glass.

What I claim as my invention, and desire to secure by Letters Patent, is—

1. The combination of the glass vessel A, constructed upon curved lines, substantially as described, and with an imperforated bottom, with a removable glass tube, the lower end of which is supported upon feet or lugs, and is enlarged, whereby the water is discharged in a thin sheet and compelled to follow the curvature of the bottom and sides of the vessel, substantially as and for the purpose specified.

2. The combination, with the glass vessel A, constructed upon curved lines and having an imperforated bottom, and provided with a glass tube having its lower end enlarged, and operating substantially as described, of the rim B and the removable wire-cloth screen C, resting upon said rim, substantially as and for the purpose specified.

OREN M. CHASE.

Witnesses:
H. S. SPRAGUE,
A. BARTHEL.